(12) United States Patent
Spence

(10) Patent No.: US 11,061,697 B2
(45) Date of Patent: *Jul. 13, 2021

(54) DISTRIBUTED PROCESS FRAMEWORK

(71) Applicant: Mark Spence, San Mateo, CA (US)

(72) Inventor: Mark Spence, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,382

(22) Filed: Apr. 17, 2020

(65) Prior Publication Data

US 2020/0264903 A1 Aug. 20, 2020

Related U.S. Application Data

(63) Continuation of application No. 16/032,003, filed on Jul. 10, 2018, now Pat. No. 10,732,994, which is a continuation of application No. 15/587,303, filed on May 4, 2017, now Pat. No. 10,051,088, which is a continuation of application No. 14/788,738, filed on Jun. 30, 2015, now Pat. No. 9,749,447.

(60) Provisional application No. 62/019,330, filed on Jun. 30, 2014, provisional application No. 62/019,270, filed on Jun. 30, 2014.

(51) Int. Cl.
*G06F 9/445* (2018.01)
*G06F 9/48* (2006.01)
*G06F 8/30* (2018.01)
*H04L 29/06* (2006.01)
*H04L 29/08* (2006.01)
*G06F 9/54* (2006.01)

(52) U.S. Cl.
CPC ............ *G06F 9/44526* (2013.01); *G06F 8/30* (2013.01); *G06F 9/485* (2013.01); *G06F 9/542* (2013.01); *H04L 67/34* (2013.01); *H04L 67/42* (2013.01)

(58) Field of Classification Search
CPC ........ G06F 8/30; G06F 9/44526; G06F 9/485; G06F 9/542; H04L 67/34; H04L 67/42; H04L 67/02; H04L 67/26
See application file for complete search history.

(56) References Cited

U.S. PATENT DOCUMENTS

| | | | |
|---|---|---|---|
| 8,886,521 B2 * | 11/2014 | Patch | G10L 15/26 704/9 |
| 9,021,419 B2 * | 4/2015 | Pana | G06F 8/20 717/105 |
| 9,218,166 B2 * | 12/2015 | Ramanathan | G06F 8/36 |
| 9,471,345 B2 * | 10/2016 | Jain | G06F 9/45525 |
| 9,749,447 B2 * | 8/2017 | Spence | H04L 67/34 |
| 10,051,088 B2 * | 8/2018 | Spence | H04L 67/34 |
| 10,732,994 B2 * | 8/2020 | Spence | G06F 8/30 |
| 2020/0019413 A1 | 1/2020 | Spence | |

* cited by examiner

*Primary Examiner* — Michael C Lai
(74) *Attorney, Agent, or Firm* — Smith Tempel Blaha LLC; Gregory Scott Smith

(57) ABSTRACT

Providing a distributed processing framework. Initially, the process begins by building a server process plug-in by invoking a code generation module to generate required boilerplate and cross-platform code. Then commencing a server process by loading plug-in code and giving it a thread of control. In addition, client machines discovering the existence of a plug-in code being executed. Further, one or more client applications running on a client server at least issuing commands to the plug-in code, monitoring the events of the plug-in code, update the properties of the plug-in code without information regarding the plug-in interface.

18 Claims, 5 Drawing Sheets

DISTRIBUTED PROCESS FRAMEWORK

CROSS-REFERENCE TO RELATED APPLICATIONS

This application is a continuation of U.S. application Ser. No. 16/032,003 filed on Jul. 10, 2018, which application is a continuation of the U.S. application Ser. No. 15/587,303 filed on May 4, 2017, which is a continuation of U.S. application Ser. No. 14/788,738, filed on Jun. 30, 2015 and bearing the same title, which application claims the benefit of the filing date of the following United States Provisional Applications for patent, both of which are incorporated herein in their entireties: U.S. Provisional Ser. No. 62/019,270 filed on Jun. 30, 2014 and, U.S. Provisional Ser. No. 62/019,330 filed on Jun. 30, 2014. Each of the above referenced applications is incorporated herein by reference in their entirety, including each of the Exhibits therein.

BACKGROUND

Traditionally, there is a significant amount of development costs and time in the deployment of both real-time and non-real time distributed computing systems. Not only is this inefficient from a market perspective but it also results in retarding significant technological growth as in many situations, products on the market tend to raise the technological floor and foster creativity to once again move beyond status quo. Thus, there is a need in the art for a system and method to significantly reduce the development costs and time to market associated with the production and deployment of both real-time and non-real-time distributed computing systems.

SUMMARY

The SES Distributed Process Framework (SES-DP™) was designed to significantly reduce the development costs and time to market associated with the production and deployment of both real-time and non-real-time distributed computing systems. The SES-DP Framework utilizes a client-server model of distributed computing in which server machines provide hard-real-time or non-real-time computing services to client machines. The server side computing services, referred to as server processes, are implemented as stand-alone server plug-ins that can be loaded and instantiated into a remote server at run time. Once loaded, each server process exports a process specific command and control interface that can be discovered and invoked by any client side machine. The SES-DP tool suite provides for the rapid development of both server plug-ins and client applications. Server plug-ins are quickly constructed using the SES-DP code generator, which automatically takes care of cross-platform build details so that a server process can be written once and deployed across an assortment of server operating systems and hardware architectures. Client applications are quickly constructed using the SES-DP support for popular high-level scripting languages, like Perl and Python. The SES-DP client-server network protocol provides additional support for rapid construction. The protocol has a simple, uniform design featuring extensible command messages that make it easy to add new server commands or change existing ones. The developers of SES-DP have leveraged their extensive backgrounds in distributed hard-real-time development to produce an efficient system that they use on a daily basis to build large-scale client-server systems. The SES-DP infrastructure has a proven track record as a foundation for reliable distributed systems built at low cost on accelerated schedules.

The following exhibits contain further information pertaining to this disclosure and they are incorporated into this application by the above incorporation by reference of the priority provisional applications listed above in the CROSS-REFERENCE TO RELATED APPLICATIONS section:
EXHIBIT A—CODE HEADER
EXHIBIT B—DEVELOPER'S GUIDE
EXHIBIT C—DEVELOPER'S GUIDE (UPDATED)
EXHIBIT D—DISTRIBUTED PROCESSING FRAMEWORK
EXHIBIT E—SES PRESENTATION
EXHIBIT F—SES-DP PRESENTATION
EXHIBIT G—SES CODE

DETAILED DESCRIPTION OF VARIOUS EMBODIMENTS

Figure 1:
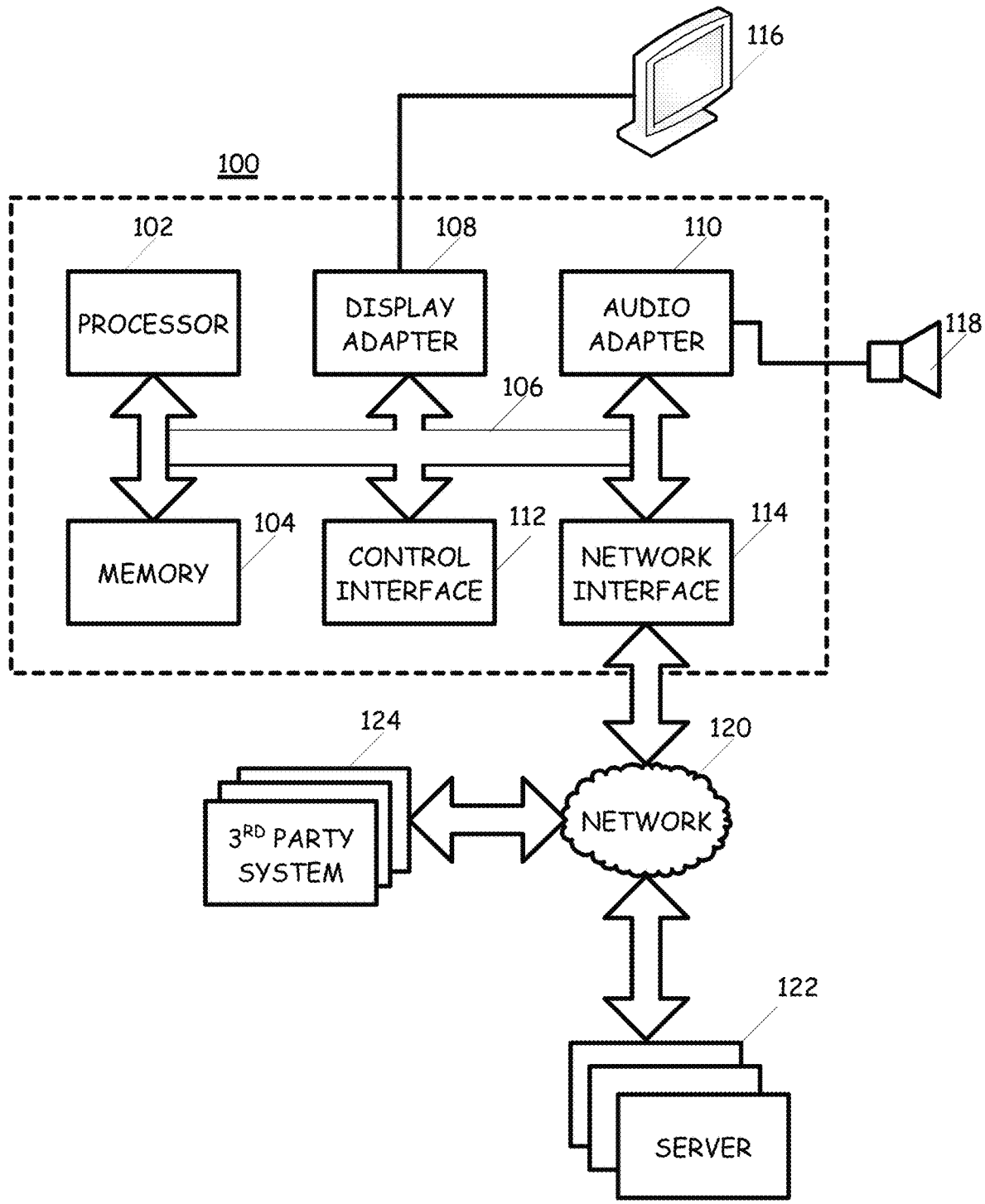
FIG. 1 is a block diagram showing a platform onto which embodiments and aspects of the disclosed embodiments may be incorporated or implemented.

FIG. 1 is a functional block diagram of the components of an exemplary embodiment of system or sub-system operating as a controller or processor 100 that could be used in various embodiments of the disclosure for controlling aspects of the various embodiments. It will be appreciated that not all of the components illustrated in FIG. 1 are required in all embodiments of the activity monitor but, each of the components are presented and described in conjunction with FIG. 1 to provide a complete and overall understanding of the components. The controller can include a general computing platform 100 illustrated as including a processor/memory device 102/104 that may be integrated with each other or, communicatively connected over a bus or similar interface 106. The processor 102 can be a variety of processor types including microprocessors, micro-controllers, programmable arrays, custom IC's etc. and may also include single or multiple processors with or without accelerators or the like. The memory element of 104 may include a variety of structures, including but not limited to RAM, ROM, magnetic media, optical media, bubble memory, FLASH memory, EPROM, EEPROM, etc. The processor 102, or other components in the controller may also provide components such as a real-time clock, analog to digital convertors, digital to analog convertors, etc. The processor 102 also interfaces to a variety of elements including a control interface 112, a display adapter 108, an audio adapter 110, and network/device interface 114. The control interface 112 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 108 can be used to drive a variety of alert elements 116, such as display devices including an LED display, LCD display, one or more LEDs or other display devices. The audio adapter 110 interfaces to and drives another alert element 118, such as a speaker or speaker system, buzzer, bell, etc. The network/interface 114 may interface to a network 120 which may be any type of network including, but not limited to the Internet, a global network, a wide area network, a local area network, a wired network, a wireless network or any other network type including hybrids. Through the network 120, or even directly, the controller 100 can interface to other devices or computing platforms such as one or more servers 122 and/or third party systems 124. A battery or power source provides power for the controller 100.

The SES Distributed Process Framework (SES-DP™) was designed to significantly reduce the development costs and time to market associated with the production and deployment of both real-time and non-real-time distributed computing systems. The SES-DP Framework utilizes a client-server model of distributed computing in which server machines provide hard-real-time or non-real-time computing services to client machines. The server side computing services, referred to as server processes, are implemented as stand-alone server plug-ins that can be loaded and instantiated into a remote server at run time. Once loaded, each server process exports a process specific command and control interface that can be discovered and invoked by any client side machine. The SES-DP tool suite provides for the rapid development of both server plug-ins and client applications. Server plug-ins are quickly constructed using the SES-DP code generator, which automatically takes care of cross-platform build details so that a server process can be written once and deployed across an assortment of server operating systems and hardware architectures. Client applications are quickly constructed using the SES-DP support for popular high-level scripting languages, like Perl and Python. The SES-DP client-server network protocol provides additional support for rapid construction. The protocol has a simple, uniform design featuring extensible command messages that make it easy to add new server commands or change existing ones. The developers of SES-DP have leveraged their extensive backgrounds in distributed hard-real-time development to produce an efficient system that they use on a daily basis to build large-scale client-server systems. The SES-DP infrastructure has a proven track record as a foundation for reliable distributed systems built at low cost on accelerated schedules.

Various embodiments will be described using the term "SES Distributed Process or SES-DP™. The SES-DP framework provides a generalized platform for commanding and controlling user specific real-time or non-real-time processes across multiple machines, processors, and processor cores. The SES-DP™ infrastructure consists of one or more client machine(s) that command and control a collection of realtime or non-real time distributed process server nodes. Each SES-DP™ server node can be commanded to load, execute, and control one or more user specific processing tasks. Once active, user specific processing tasks can run in lock step with hardware based system clock plug-ins and communicate with other distributed processing tasks using the SES-DP™ publish/subscribe or stream 1/0 communication facilities.

Users utilize the SES-DP™ C++ code generation tools to produce user specific processing plug-ins from a schema based XML description file that specifies all of the commands, properties, events, streams, and publish subscribe interfaces that the user process will require. The user specific processing plug-ins can then be pushed onto one or more SES-DP server nodes and executed in hard-real-time or non-real time depending on which operating system the selected SES-DP™ server or servers are running. Once running, the user specific distributed process command set can be remotely discovered and executed by any of the SES-DP networked client interfaces without client side code modifications or recompilation. This allows new or updated user process code to be plugged into an operational system without bringing the system or any of its active processes down.

The SES-DP™ framework provides powerful Perl based client side interface modules that allow users to load, command, and control all of their available distributed processing plug-ins across multiple machines that could be running different operating systems from Perl. This allows users to configure and control large complex real-time distributed systems or entire facilities from a single Perl script. User distributed process objects can be rapidly developed for any application including real-time dynamic hardware control systems, sequential process control systems, distributed real-time or non-real-time simulation systems, etc.

Figure 2:
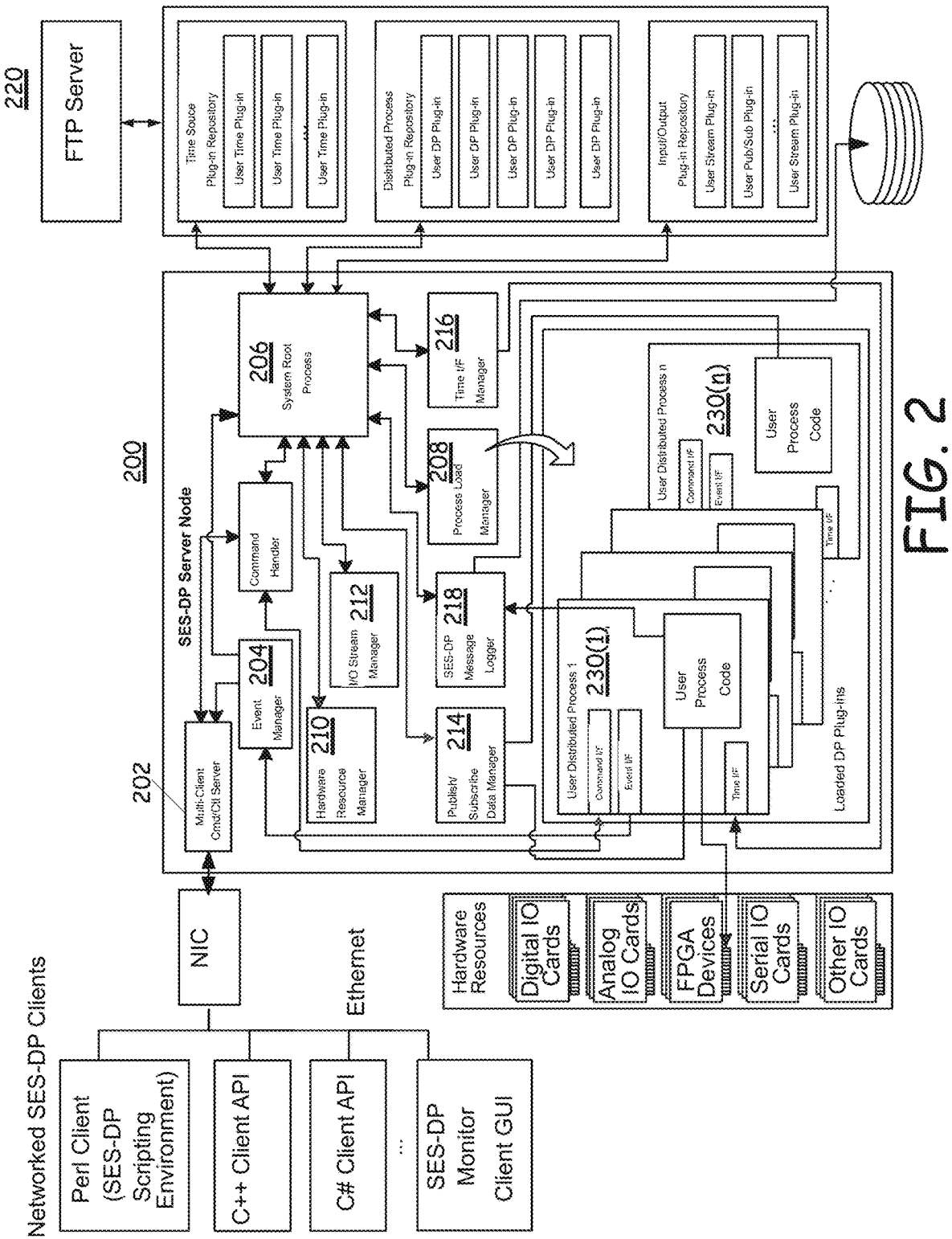
FIG. 2 is a functional block diagram illustrating various components that may be included in various embodiments.

The SES-DP server, illustrated in FIG. 2, utilizes a collection of built-in subsystems that allow the server to handle a vast array of user specific operations. These subsystems include the Multi-Client Command and Control Server 202, the Event Manager 204, the System Root Process 206, the Process Load Manager 208, the Hardware Resource Manager 210, the 1/0 Stream Manager 212, the Publish/Subscribe Manger 214, and the Time 1/F Manager 216.

The SES-DP server 200 utilizes an advanced event notification interface that allows client applications to register listeners for server side events and receive and react to those server side events without polling operations. Client scripts and applications may register listeners for any of the SES-DP server specific or user distributed process specific events that are resident within the server 200. If server side event is triggered and that event has one or more registered client listeners, the Multi-Client Command and Control Server 202 will notify the registered clients by automatically transmitting the triggered event's property list to those clients. Client applications leverage the SES_RtLib event object hierarchy to register object oriented client side callbacks when a server side event is fired.

The Multi-Client Command and Control Server 200 is responsible for handling all external network based client connections to the SES-DP server node 200. This interface provides full support for multiple clients and handles all command and control traffic directed toward both the SES-DP System Root Process 206 and the instantiated user distributed process objects. In addition, this interface automatically handles the SES-DP server side event notification transmissions to all registered clients.

The System Root Process 206 handles the command and control responsibilities for each of the subsystem managers that are contained within the SES-DP server 200. These include the Process Loader Manager 208, the Hardware Resource Manager 210, the 1/0 Stream Manager 212, the Publish/Subscribe Manager 214, and the Time I/F Manager 216. In addition, the System Root Process 206 handles the configuration of the SES-DP message logger subsystem 218 as well as all server state reporting operations. The System Root Process 206 accomplishes this by exporting a command and control interface that is utilized in the configuration and control of each of the attached subsystem managers. As is the case with all SES-DP framework exported command interfaces, the server command and control interface is automatically discovered by all clients that connect to the server. For a complete description of the available system root command set, refer to the Exhibits.

The Process Load Manager 208 is responsible for loading, initializing, and running user distributed process objects on the SES-DP server 200. It is also responsible for unloading the user distributed process objects when they are no longer desired and handling any exceptions that occur during process instantiation. User distributed process object plugin modules must first be loaded into the SES-DP distributed process plug-in repository before they can be instantiated within the SES-DP server 200. This is typically handled using the resident FTP server 220 on the system. The Process Load Manager 208 is controlled through the SES-DP System Root Process 206 using the process load exported command set. When loading a distributed process, users must specify the plug-in DLL or shared object name along with the instance number to assign the distributed process object once it is instantiated. The SES-DP system 200 allows multiple instances of the same user distributed process to be instantiated as long as each process has a unique instance number and the server configured maximum process specific number of instances has not been exceeded. If either of these restrictions is not adhered to, an exception is thrown and the new process is not instantiated. Because the SES-DP framework utilizes an OS abstraction layer, all SES-DP code is OS independent and users do not have to rewrite their distributed process code when they want to run their code on a SES-DP server that is utilizing a different operating system. Once a user has completed his or her distributed process code, he or she can then cross compile this code for any of the SES-DP supported operating systems. This is accomplished using the OS specific project file or makefile that is auto generated by the SES-DP distributed process code generator 230(1)-230(n) when the user code was generated. The auto generated project files and makefiles utilize a canonical OS specific sub-directory naming convention that allows all target flavors of the user distributed process object to exist below the same directory tree. The SES-DP distributed process plug-in repository tree contains plug-in sub-directories that utilize OS specific target names such as pemw32, pemets, pclinux, safaris gee, etc. This scheme is utilized throughout the SES-DP framework and can be found in both the SES-DP SDK and the SES-DP server nodes. When an OS specific build is performed on the user distributed process codebase, the target plug-in binary file is automatically transferred into the appropriate OS specific directory on the development workstation. The OS specific binary plug-in modules can then be transferred into the appropriate OS specific directory on an available SES-DP server using the SES-DP framework provided distributed process FTP transfer scripts.

The Hardware Resource Manager 210 is responsible for allocating hardware resources to the loaded distributed process objects. Once a system hardware resource has been allocated to a specific distributed process, that resource can be utilized within both the distributed process specific real-time processing method and any of the exported distributed process command methods. Supported hardware resources include: Analog IO cards 240, Digital IO cards 242, system bus controller cards 244, NIC cards 246, RS-422 cards, custom FPGA based boards 248, etc. In addition to allocating the hardware resources, the Hardware Resource Manager 210 ensures that multiple user distributed process objects do not attempt to re-task programmable hardware in incompatible ways. A typical example of this would occur if a newly instantiated distributed processing object was allowed to reprogram an FPGA device that is already programmed with a different FPGA design and under the control of a separate distributed process. If allowed, this condition would most likely result in a system crash. The SES-DP Server Hardware Resource Manager 210 prevents this error condition by only allowing one active resident design to exist within any of its FPGA devices at a time.

The SES-DP framework provides two powerful mechanisms that allow multiple process objects to communicate with one another. These include I/O streams for stream based communications and topic based publish/subscribe for data point based communications. The I/O Stream manager handles all I/O stream based connections and the Publish/Subscribe Manager handles all data point based connections. SES-DP input/output stream objects provide a convenient FIFO based byte stream implementation that can be leveraged to allow distributed process objects to pipe data between one another. The SES-DP server provides a pool of physical stream objects that can be leveraged by any user distributed process. This pool includes the standard I/O stream shared memory objects that are included with the base SES-DP server by default and can optionally include user specific I/O stream objects that can be created as plug-in modules using the SES-DP I/O Stream plug-in SDK. Once created, these stream plug-in modules are assigned a unique name and added to the SES-DP server using the System Root Process' exported stream management command set. The I/0 Stream Manager is responsible for assigning any of the available physical I/0 stream objects to the requesting distributed process objects during process initialization. This is accomplished by setting the process specific initialization arguments that are present for each required distributed process stream to the name of the physical system stream. Users add I/O stream input and output interface objects to their distributed process objects by utilizing the powerful SES-DP code generation framework. This is accomplished by simply adding a line to the user distributed process XML file for each required input or output stream object and executing the code generator. The code generator then automatically generates interface code within the user distributed process C++ files for each required stream. Initialization arguments that assign the distributed process' stream interface objects to any of the available physical SES-DP streams are automatically added to the distributed process by the code generator. These arguments are then utilized during distributed process object initialization to assign a unique physical input or output stream to each of the distributed process stream interface objects. Publish/Subscribe Data Based Communications by the SES-DP framework allows distributed process objects to communicate with one another using an extensible transport specific publish subscribe infrastructure. As the names imply, publishers are responsible for writing process specific topic data values and subscribers are responsible for reading the published external values. Users can take advantage of the SES provided publish subscribe plug-ins or extend the base publish subscribe implementation to create their own hardware specific publish/subscribe plugins using the SES-DP publish/subscribe SDK. All SES-DP publication and subscription objects use a canonical naming convention which includes the transport implementation in the path. The SES-DP publish/subscribe transfer interface is topic centric. This means that data is transferred from the publisher to the subscribers on a topic basis. A topic is defined as a collection of 1 to n data elements that is assigned a unique name on the publisher. Data elements contained within a publication topic can be any of the types listed in Table 2-1. This includes Booleans, signed and unsigned integers, floating point numbers and strings. In addition, numeric data element types may contain one or more elements.

TABLE 1

Standard Property Types

| Publication Data Element Types | Comment |
| --- | --- |
| Bool | The publication data element is a Boolean value or array |
| Int8 | The publication data element is a signed 8-bit integer value or array |
| Int16 | The publication data element is a signed 16-bit integer value or array |
| Int32 | The publication data element is a signed 32-bit integer value or array |
| Int64 | The publication data element is a signed 64-bit integer value or array |
| UInt8 | The publication data element is an unsigned 8-bit integer value or array |
| UInt16 | The publication data element is an unsigned 16-bit integer value or array |
| UInt32 | The publication data element is an unsigned 32-bit integer value or array |
| Float | The publication data element is single-precision floating point value or array |
| Double | The publication data element is double-precision floating point value or array |
| String | The publication data element is a string |

Each distributed process may contain zero or more data publication topics along with zero or more subscription topics. Both the publication topics and the subscription topics must be assigned a unique name within the user distributed process. Subscription topics from one distributed process are connected to publication topics from another distributed process at process instantiation time. This connection is handled by the Publish/Subscribe data manager and there is no instantiation order dependency between the publisher and subscriber. This allows distributed process A to publish data that is subscribed to by an external distributed process B that is in turn publishing data that is subscribed to by distributed process A. When a distributed process subscription is coupled to a publication from a separate distributed process, the Publish/Subscribe data manager ensures that the defined subscription is compatible with the publication. The only requirement here is that all data elements defined in the subscription topic exist within the publication topic. This means that the contents of subscription topics can be subsets of the contents of publication topics.

Once a publication topic has been defined, users can write the publication topic data to the subscribers of the topic using the topic specific SES publication object's PublishData method. Subscriber objects within the receiving distributed process object will see the new topic data after the next topic specific subscription object's UpdateData method is called.

The SES-DP code generator handles the generation of all of the topic specific registration code and all of the publication and subscription specific configuration code. Users simply define the names, types, and array sizes of the data elements that are contained within each of the desired publication and description topics using the schema base SES distributed process XML configuration file and the code generator will generate all of the required C++ code automatically. The user then can decide where in their real-time processing code or command handling code that they wish to invoke the publication operation for their publications or the subscription update operation on their subscriptions.

The SES-DP framework provides a collection of built in or user specific server registered physical time source objects that can be coupled to the time interface contained within any user distributed process at instantiation time. Once a distributed process is coupled to a time source object, the time interface objects can be used to synchronize the distributed process object's processing to external time sources, physical hardware events, or any other distributed processing objects. If a distributed processing object's execution model type is frame based, the time interface object is used to control the object's real-time frame processing rate. With this configuration, the distributed process' frame based processing code will automatically be advanced each time the time interface object advances. This advancement may either be at the physical time interface frequency or at a derived frequency relative to the physical time source frequency as determined by the configuration of the distributed process' time interface object. When hardware interrupt based hard-real-time time sources are utilized, frame based distributed processing code can be directly advanced each time the interrupt fires. When a user distributed process object is coupled to one of the available SES-DP time source objects, the user must specify the desired derived frequency and offset that the user process will run at. The derived frequency value is specified in Hz and must equal the parent time source frequency divided by a positive integer. This allows the distributed process to operate at speeds equal to the parent time source or at any natural divided value. The offset value specified at initialization time is used to add a phase offset into the distributed process' interface clock. This value is in terms of parent time source ticks and is only meaningful if the derived frequency is less than the parent clock hardware frequency. The phase offset is always defaulted to a value of zero if not set. If it is set, it must be less than the parent clock frequency divided by the derived frequency. The Time Interface plug-in repository contains all of the time source objects that are loaded on the SES-DP server. This repository contains the default SES-DP framework provided time source objects as well as any user specific plug-in time interface objects that have been created using the SES-DP time interface plug-in SDK. Once a user specific time source plug-in has been built, the plug-in module must be loaded into the SES-DP's time source plug-in repository. This is typically handled using the SES-DP's resident FTP server.

The SES-DP framework supports both user specific plug-in and built in time source objects. The SES-DP framework ships with numerous general purpose time sources that can be used right out of the box to drive user specific distributed process objects. These include the Internal System Clock time source, the faster than real-time NRT time source, the SES NTSC or PAL video broadcast synchronization time source, and the SES external hardware event time source among numerous other SES developed plug-in based time sources.

The SES-DP framework's internal system clock time source allows the user to synchronize distributed process objects running on the same machine across multiple CPU cores. This time source utilizes the SES-RtLib OS abstracted time source objects to drive the distributed process objects time interface objects relative to the system's internal wall clock. Users simply specify the desired frequency of operation for each of the internal system clock time source when the time source is created and added to the SES-DP server using the SES-DP server specific time source commands.

The SES-DP framework's faster than real-time NRT time source allows the user to run the coupled distributed process code as fast as possible while maintaining the specified synchronization relationships between all of the distributed processes that are coupled to the time source. Users can utilize this time source for computationally intensive distributed simulation tasks where the minimization of the time to complete the simulation run is more important than running time synchronous to a hardware clock source. One of the key benefits of the SES-DP framework is that users can then simply reconfigure the system to run the same simulation with one of the supported real-time time sources when real-time hardware clock synchronization is desired. As with the Internal System Clock Time Source, user simply specify the desired frequency of operation for the faster than real-time time source although in this case, the frequency is used for synchronization and process execution rate purposes only.

Each SES-DP Server node utilizes an OS specific FTP server. The FTP server is responsible for transferring plug-ins modules to the SES-DP server. This includes user distributed process plug-ins, time interface plug-ins, and user specific stream plug-ins. Once a plug-in has been loaded into the appropriate plug-in repository, the SES-DP server can then be commanded to load and run the plug-in specific code on the server. When the user has completed the desired operations with the plug-in module, the SES-DP server can then be commanded to unload the module.

Figure 3:
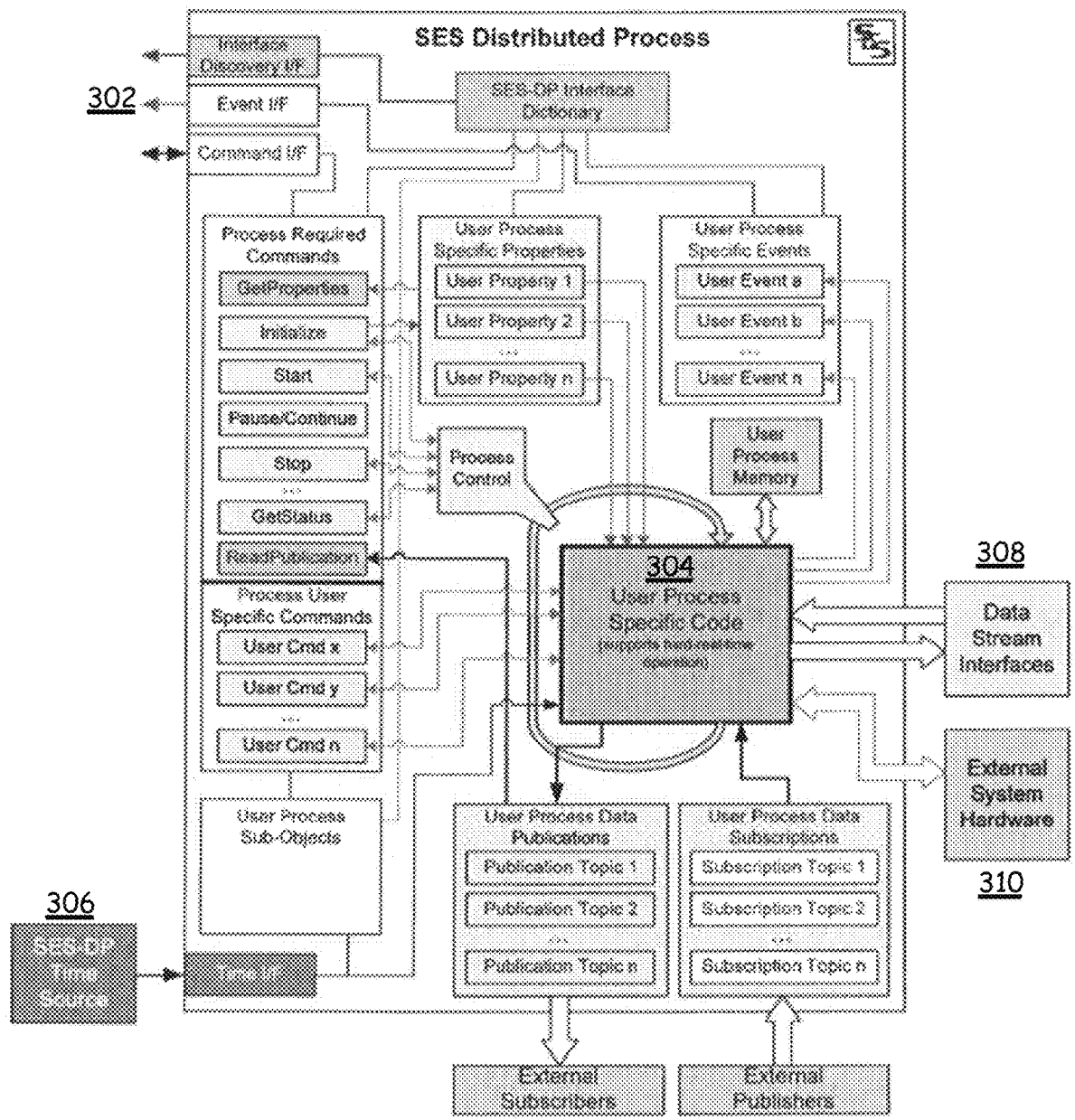
FIG. 3 illustrates a command and event interface.

SES Distributed Process Objects (DPOs) are plug-in based user code modules that can be dynamically loaded, configured, commanded, and unloaded on any active SES-DP server node that is resident on the user's network. These plug-in modules are operating system independent and support real-time operations. Each DPO contains a command and event interface 302, a user specific processing engine 304, a time synchronization interface 306, data communication interfaces 308, and support for external hardware control 310 as illustrated in FIG. 3.

Figure 5:
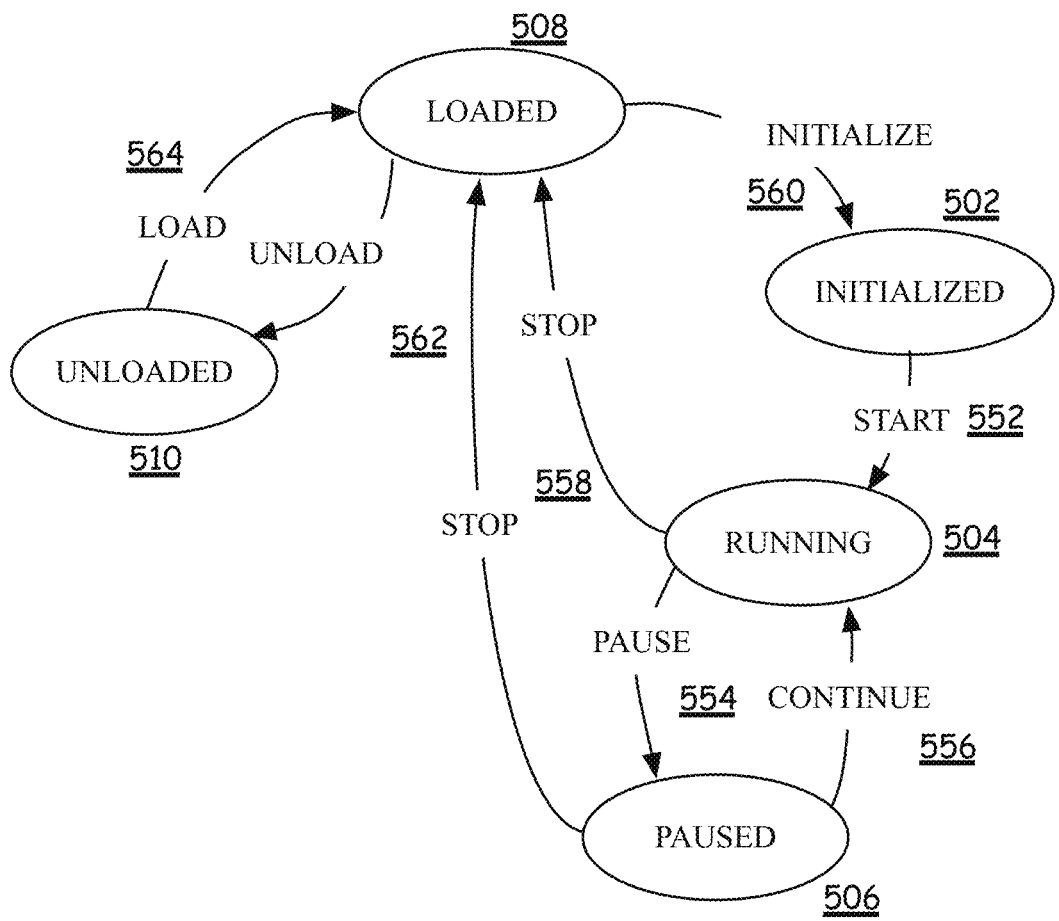
FIG. 5 is a state diagram illustrating SES distributed process state transitions.

All user developed DPOs are built from a common codebase that can be cross compiled and linked to run on any of the SES-DP environment supported operating systems. This includes Windows, Interval Zero-Phar Lap ETS, RTOS32, Linux, and Solaris. The SES-DP Framework provides an advanced DPO code generation/modification utility that allows users to rapidly generate or modify their DPO specific C++ code and OS specific project/makefiles by simply filling out a schema based XML, configuration file. This allows the user to focus his or her efforts on solving the problem at hand without getting bogged down in framework overhead issues. For more information on this topic, refer to section 4 of Exhibit B. DPOs support hard-real-time processing applications and can literally be written to support any user application. They provide the following features to the user: • Supports complete command and control operations across a standard network • Supports user specific network based commands • Supports user specific event notification • Supports hard-real-time processing operation within the user processing section • Supports synchronization to internal or external time sources • Supports the auto-generation of DPO C++ code using the SES-DP code generation tool suite • Supports the auto discovery of user specific DPO command and control interfaces to all connecting client applications • Supports deployment on multiple operating systems without DPO code modification • Supports Stream based I/O communications to and from external DPOs connected to the system • Supports topic based publish/subscribe data communications between multiple DPOs • Supports the direct interfacing with system analog and digital hardware (including the direct programming of FPGA devices). All distributed process objects utilize the state transition diagram illustrated in FIG. 5. After a distributed process object has been loaded on an active SES-DP server, it must be transitioned to the Initialized state 502 before it will accept a Start command 552 and transition into the Running state 504. Once any distributed process object is in the Running state 504, its processing can be paused by issuing the Pause command 554. From the Paused state 506, the distributed process' processing can be resumed by issuing the Continue command 556. A distribute process can be stopped from either the Running 504 or the Paused state 506 by issuing the Stop command 558. This transitions the distributed process back into the Loaded state 508 where it can either be re-initialized 560 or unloaded 562 from the server. An Unload command 562 transitions to the Unloaded state 510, from which a Load command 564 can cause a transition back to the Loaded State 508.

Figure 4:
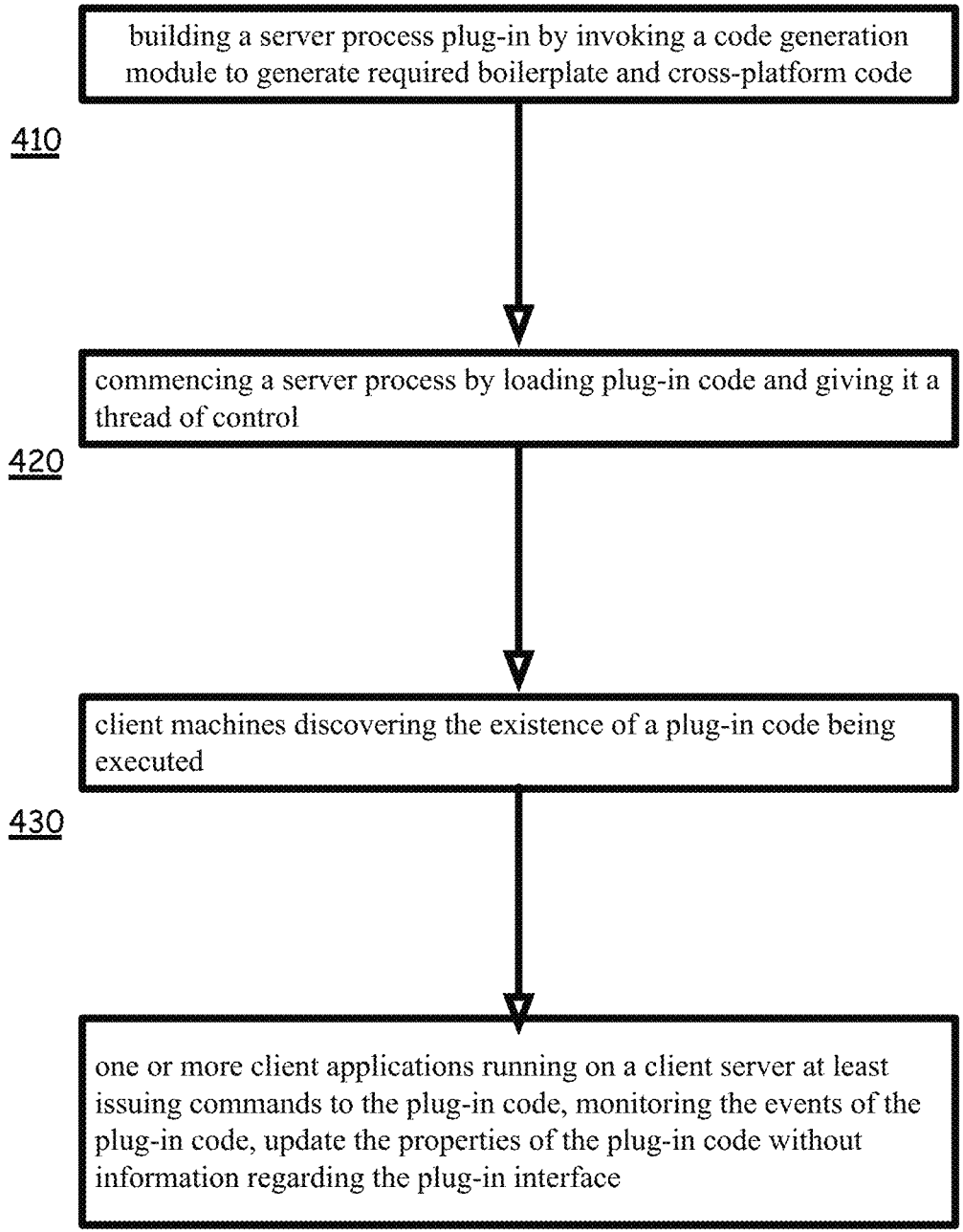
FIG. 4 is a flow diagram illustrating steps involved in an exemplary embodiment.

FIG. 4 is a flow diagram illustrating steps involved in an exemplary embodiment. The steps illustrate a method for providing a distributed processing framework 400. Initially, the process begins by building a server process plug-in by invoking a code generation module to generate required boilerplate and cross-platform code 410. Then the process includes commencing a server process by loading plug-in code and giving it a thread of control 420. In addition, the process includes client machines discovering the existence of a plug-in code being executed 430. Further, the process includes one or more client applications running on a client server at least issuing commands to the plug-in code, monitoring the events of the plug-in code, update the properties of the plug-in code without information regarding the plug-in interface 440.

It will be appreciated by persons skilled in the art that the present invention is not limited by what has been particularly shown and described herein above. Rather the scope of the invention is defined by the claims that follow.

What is claimed is:

1. A system for providing a development environment for distributed computing systems, the system comprising:
   one or more remote servers configured to load and execute one or more server processes comprising stand-alone server plug-ins;
   each of the one or more server processes, being executed on one of the one or more remote servers, comprise a subscriber interface that is published by the applicable server process such that the published subscriber interface can be discovered and invoked by any of a plurality of client applications running on any of a plurality of client machines that communicatively coupled to the one or more remote servers over a network; and
   one or more client applications invoking functionality of one or more the server processes by issuing commands to a particular server process in accordance with the published subscriber interface for the particular server process;
   whereby the stand-alone server plug-ins of the particular server process can be modified, thereby changing functionality of the particular server process without modifying the one or more client applications.

2. The system of claim 1, wherein each of the one or more server processes is configured to enter a loaded state upon loading the stand-alone plug-in and to enter an initialized state upon receiving an initialize command from one of the one or more client applications.

3. The system of claim 1, further comprising a code generator configured to generate code for the one or more server processes for the one or more remote servers based on the operating system running on each particular remote server and the network architecture of each particular remote server.

4. The system of claim 1, further comprising a client side interface module configured such that a particular client application can load, command and control multiple server processes across multiple remote servers agnostic to the operating system running on each of the remote servers.

5. The system of claim 4, wherein at least one of the one or more client applications is a PERL script.

6. The system of claim 4, wherein at least one of the one or more client applications is a Python script.

7. The system of claim 4, wherein at least one of the one or more client applications is a high-level language script.

8. The system of claim 7, wherein each of the one or more remote servers further comprises a hardware resource manager configured to allocate hardware resources of under the control of a particular remote server to a particular server process.

9. The system of claim 8, wherein the hardware resource manager for each of the one or more remote servers is configured to allocate one or more resources including analog input/output cards, custom field programmable gate-array based boards, digital input output cards, system bus controller cars and network interface cards.

10. The system of claim 9, wherein the hardware resource manager for each of the one or more remote servers is further configured to ensure that once a particular hardware resource is allocated to the particular server process, other server processes are prevented from re-tasking the particular hardware source.

11. The system of claim 4, wherein the client side interface module configured such that a particular client application can perform various operations by sending commands to a first server process running on a first remote server and a second server process running on a second remote server.

12. The system of claim 11, further comprising an event notification interface configured to accept listener registrations from one or more client applications and to automatically transmit information to the one or more client applications that are registered listeners.

13. The system of claim 12, wherein the even notification interface is further configured to accept listener registrations from one or more of the client applications for a specific server process event and to automatically transmit information to the one or more client applications that are registered listeners when the specific server process event occurs.

14. A method for providing a development environment for distributed computing systems comprising the actions of:
  building a server process plug-in by invoking a code generation module to generate an operating system independent cross-platform coding;
  commencing a server process by loading the server process plug-in and giving the server process plug-in a thread of control;
  the server process publishing a subscriber interface that can be discovered and invoked by any of a plurality of client applications running on any of a plurality of client machines;
  one or more client applications invoking functionality of the server process by issuing commands to the server process in accordance with the published subscriber interface;
  modifying the server process plug-in to change functionality of the server process without modifying the one or more client applications.

15. The method of claim 14, wherein a client application can perform various operations by sending commands to a first server process running on a first server and a second server process running on a second server.

16. The method of claim 14, wherein the one or more client applications are written in a high-level scripting language.

17. The method of claim 14, further comprising the actions of:
  receiving listener registrations from one or more of the plurality of client applications;
  automatically transmitting information to the one or more client applications that are registered listeners upon the occurrence of server process events.

18. The method of claim 14, further comprising the actions of:
  receiving listener registrations from one or more of the plurality of client applications for a specific server process event;
  the server process triggering the specific server process event; and
  automatically transmitting the properties of the triggered specific server process event to the client applications that provided listener registrations for the specific server process event.

* * * * *